United States Patent

[11] 3,600,888

| [72] | Inventors | Harley F. Nethken<br>North Palm Beach;<br>Thomas R. Warwick, Jupiter, both of, Fla. |
|---|---|---|
| [21] | Appl. No. | 36,522 |
| [22] | Filed | May 12, 1970 |
| [45] | Patented | Aug. 24, 1971 |
| [73] | Assignee | United Aircraft Corporation<br>East Hartford, Conn. |

[54] POWER MANAGEMENT CONTROL FOR A MULTIENGINE INSTALLATION
7 Claims, 1 Drawing Fig.

[52] U.S. Cl. ........................................... 60/39.15,
60/39.16 R, 60/39.28 P
[51] Int. Cl. .......................................... F02c 7/02
[50] Field of Search............................. 60/39.16,
39.15, 39.14, 39.28 P; 416/25, 27, 28, 29, 30;
115/34, 37

[56] References Cited
UNITED STATES PATENTS

| 3,163,983 | 10/1965 | Donohue | 60/39.15 |
|---|---|---|---|
| 3,181,353 | 5/1965 | Brahm | 60/39.16 X |
| 3,307,351 | 3/1967 | Wheeler | 60/39.15 |
| 3,365,882 | 1/1968 | Greune | 60/39.15 |
| 3,516,250 | 6/1970 | Moore | 60/39.16 |
| 3,526,091 | 9/1970 | Schuster | 60/39.16 |

*Primary Examiner*—Clarence R. Gordon
*Attorney*—Norman Friedland

ABSTRACT: A power management control in which the output of a speed error integrator and the output of a torque balance integrator are summed in such a manner as to selectively "beep," that is adjust, the power of both engines up or down to correct speed error and to "beep" up the power of the engine with the lower torque to equalize the load on each engine. The invention herein described was made in the course of or under a contract with the Department of the Army.

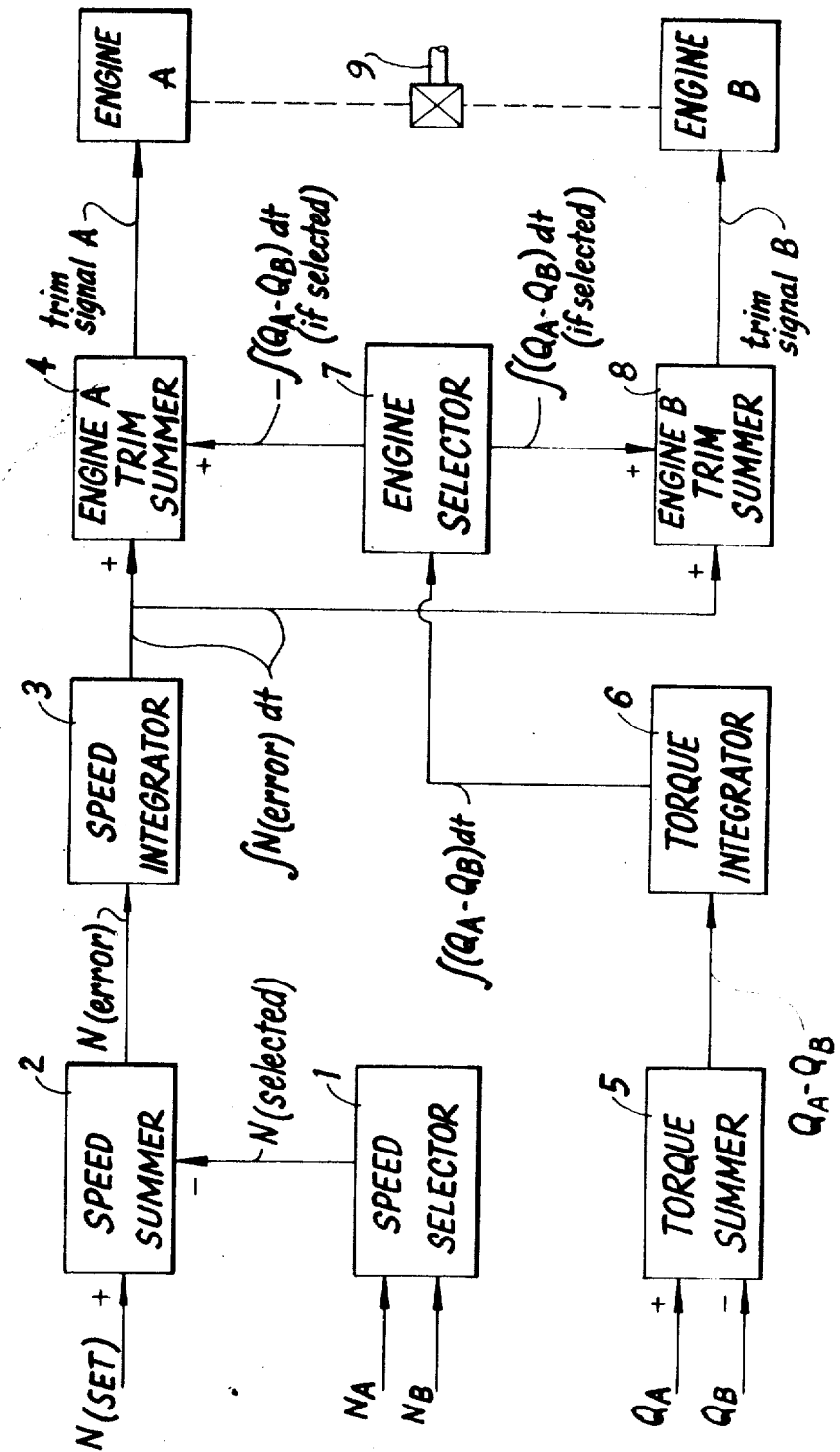

POWER MANAGEMENT CONTROL FOR A MULTIENGINE INSTALLATION

CROSS-REFERENCE TO RELATED APPLICATIONS

This application constitutes an improvement over U.S. Pat. No. 3,174,284 entitled "Power Management Fuel Control for Plural Gas Turbine Engines" and U.S. Pat. No. 3,174,551 entitled "Power Management Control for Helicopters," both granted to C. D. McCarthy on Mar. 23, 1965 and both being assigned to assignee of this application.

BACKGROUND OF THE INVENTION

This invention relates to a power management system for controlling the speed and equalizing the loads of two or more engines driving a common shaft connecting a variable or fixed load.

In the heretofore-known power management systems, as for example the one described in U.S. Pat. No. 3,174,551, supra, the load unbalance detector produces signals to raise the torque of the lower power engine and lower the torque of the higher power engine in order to achieve a torque balance. In the event of a partial or complete loss of power of one engine, the power of the remaining engine is reduced. This characteristic compounds the effect of the initial failure.

In addition, the tach failure detector selects for system use the speed signal from the slave engine only after significant error has developed in the signal from the master engine. In the event of a failure of the speed signal from the master engine or of the associated speed sensor circuit or the error circuit, a large speed error which normally is 20 percent must develop before the speed signal from the slave engine will be selected. Obviously, this large speed error will exist prior to the selection and for some time after the selection.

In the case of a failure of the torque-measuring system it is desirable that the pilot of the aircraft have available the option to disable the torque balance feature of the power management system and that the system retain control of the engines on the basis of speed only. The circuit described in the reference U.S. Pat. No. 3,174,551, supra, is dependent upon the presence of the torque circuit, including the load unbalance detector. With the torque circuit disabled, the engines will tend to diverge, that is, one engine will go to maximum power and one engine will go to minimum power because the speed circuit uses two parallel integrators and it is impractical to null two parallel integrators with an error signal that is composed of both wanted and unwanted signals.

These problems can be obviated by providing a novel load-sharing or power management system for a plurality of powerplants driving a fixed or variable load. In its preferred embodiment no master-slave relationship exists between the two engines. The speed selector selects the higher of the two speed signals, the selected speed is then summed by a summer with the set speed in order to obtain a speed error which, in turn, is integrated by an integrator. In this embodiment both engines are "beeped," that is, adjusted up or down by an amount proportional to the output of the integrator and in a direction to correct the speed error. Torque signals from the two engines are compared in a summer and the error or the difference is integrated in a torque balance integrator. A selector is employed to switch the integrated torque error signal so that the engine with the lower power is adjusted by an amount proportional to the integrated error. As the torque unbalance is reduced the proportional correction to the lower engine is reduced. In case of a reversal of the lower-higher engine relationship, the control removes all correction from the first engine and applies a proportional correction to the other engine.

This arrangement of adjusting both engines to control speed and of adjusting the lower engine to control torque affords the advantage of adjusting upward the engine which has not suffered a partial or complete failure. This inherently compensates within the limits of available power of the remaining engine for failure of one engine. Furthermore, stable operation can be achieved in the event that the torque system becomes disabled. A single speed error integrator is utilized to determine the correction signal for both engines and to eliminate the tendency to diverge that would otherwise exist when parallel speed error integrators are used. Additionally, the speed selector selects the higher of the two speed signals without a system signal error and does away with the master-slave relationship.

SUMMARY OF THE INVENTION

A primary object of the present invention is to provide an improved power management system for multiengine installation.

In accordance with the present invention a single speed error integrator integrating the error between a set speed with the higher of two speed inputs selected by a speed selector independently controls the speed of the powerplant even with the torque balance circuit disabled.

A still further object of this invention is to provide a torque balance integrator for integrating the error in the torques of the two engines and to provide an engine selector for selecting one engine for adjustment on the basis of the integral of the torque error.

A still further object of this invention is to provide a control system of a multiengine aircraft installation with the following advantages:

1. No permanent master-slave relationship.
2. Provision for compensation for speed signal failure, engine power failure, and/or torque system failure.
3. In the event of a partial or complete failure of one engine, the system adjusts the remaining engine to compensate within the capability of the engine for the loss of power.
4. In the event of a failure of either speed signal, the maximum speed selector selects the better of the two signals without a system error.
5. In the event that the torque system becomes disabled, the system can be operated as a speed-dependent system.
6. A single speed error integrator to determine the correction signal for both engines and eliminate the tendency to diverge that would otherwise exist when parallel speed error integrators are used.

Other features and advantages will be apparent from the specification and claims and from the accompanying drawings which illustrate an embodiment of the invention.

BRIEF DESCRIPTION OF THE DRAWING

The sole FIGURE is a block diagram illustrating the preferred embodiment of this invention.

DESCRIPTION OF THE PREFERRED EMBODIMENT

Reference is hereby made to the sole drawing which for illustration purposes shows the power management system for speed and torque sharing of two engines cooperating to drive a variable or fixed load through a common shaft connecting a power-absorbing member such as a helicopter rotor. It is to be understood by those skilled in the art that this power management system has other uses other than helicopter control, as for example, VTOL aircraft and the like, and additionally it also can be utilized where more than two engines are employed.

A block diagram depicting a use of power management control on a twin turbine helicopter applicable to this invention is illustrated and discussed by U.S. Pat. No. 3,174,551 and is hereby referenced.

The speed of two or more turbine engines A and B driving a common shaft 9 are managed by the power management control. The speeds of the two engines are sensed and are identified as $N_A$ and $N_B$ (the reference numbers A and B throughout the description refer to the respective engine). A speed selector senses in a known and suitable manner speed signals from engines A and B. If the signals $N_A$ and $N_B$ are identical, the normal situation when neither speed sensor has failed or when the helicopter is not in an autorotation mode, the speed selector 1 can select either signal, If the speed signals are different, the speed selector selects the higher of the sensed speeds. The selected signal, N(selected) is applied to speed summer 2.

Speed summer 2 accepts the N(selected) signal and an N(set) signal whose value can be adjusted by the pilot. The speed summer 2 adds the N(set) signal value to the negative of N(selected). This sum, (the arithmetic difference between N(set) and N(selected)), produces a speed error signal N(error) which is then applied to the speed integrator 3.

The speed integrator 3 accepts the speed error signal N(error) and integrates it with respect to time, which integrated speed error signal $\int N(error)\, dt$ is then applied to engine trim summers 4 and 8.

Torque summer 5 accepts the torques, $Q_A$ and $Q_B$, from engines A and B. The torque summer 5 adds the $Q_A$ signal value to the negative of the $Q_B$ signal value. This sum, (the arithmetic difference between $Q_A$ and $Q_B$), produces the torque unbalance signal $Q_A-Q_B$ which is then applied to torque integrator 6.

Torque integrator 6 accepts the signal $Q_A-Q_B$ from the torque summer and integrates it with respect to time to produce an integrated torque unbalance signal $\int (Q_A-Q_B)\, dt$ which is then applied to engine selector 7.

Engine selector 7 accepts the integrated torque unbalance signal and transmits it to either engine trim summer 4 or 8, depending on the sign of the integrated torque unbalance signal. When the integrated torque unbalance signal is positive the engine selector 7 applies that signal to engine B trim summer 8. When the integrated torque unbalance signal is negative, the engine selector 7 changes the sign of the signal from negative to positive (i.e. reverses polarity) and applies the changed signal to engine A trim summer 4.

Engine A trim summer 4 accepts the integrated speed error signal, and if applied by engine selector 7, the reversed polarity integrated torque unbalance signal. Summer 4 adds the integrated speed error signal to the reversed polarity integrated torque unbalance signal, if present, and applies the sum to engine A. Engine A accepts the engine A trim signal and is adjusted by an amount proportional to the value of the trim signal.

Engine B trim summer 8 accepts the integrated speed error signal, and if applied by engine selector 7, the integrated torque unbalance signal. Summer 8 adds the integrated speed error signal to the integrated torque unbalance signal, if present, and applies the sum to engine B. Engine B accepts the engine B trim signal and is adjusted by an amount proportional to the value of the trim signal.

The details of the control circuitry are eliminated herefrom for the sake of simplicity and clarity. Integrators, selectors, and summers are well known in the art. For further details, reference is hereby made to paper No. 332 entitled "Helicopter Engine Dynamic Analysis" presented by Thomas R. Warwick at the 25th Annual National Forum Proceedings of the American Helicopter Society and the McCarthy patents referred to above.

It should be understood that the invention is not limited to the particular embodiments shown and described herein, but that various changes and modifications may be made without departing from the spirit or scope of this novel concept as defined by the claims herein.

1. For a multiengine installation having at least two engines driving a common shaft connecting a power-absorbing member, independent coordinating means adjusting the torque of each of said engines and the rotational speed of the common shaft, the improvement comprising a power management control for adjusting the torque of each engine so as to equalize the load carried by each of said engines, said power management control including means for selecting the higher sensed speed of either of said engines, means for comparing said higher sensed speed with a preselected speed set value for producing an error signal and adjusting said engines to change the speed to minimize said error, means for comparing the torques of said engines and for producing a torque unbalance signal indicative of the difference in torques produced by said engines, and means for selectively summing the torque unbalance signal with said speed error signal for further adjusting said engine with the lower torque value to match the torque of the other of said engines.

2. A power management control as claimed in claim 1 including integration means responding to said speed error for producing an output signal indicative of the integral of said speed error.

3. A power management control as claimed in claim 1 including integration means responding to said torque unbalance for producing an output signal indicative of the integral of said torque unbalance.

4. A power management control as claimed in claim 3 including additional integration means responding to said speed error for producing an output signal indicative of the integral of said speed error.

5. A power management control as claimed in claim 4 including selector means for selectively connecting said torque output signal with either of said engines.

6. A power management control for adjusting the speed and torque of a multiengine aircraft installation wherein at least two engines each having independent coordinated controls drive a load, said control including sensing means for sensing the speed and torque of each of said engines, means for selecting the higher of the sensed speeds of said engines, first means for comparing said higher speed with a preselected set speed for producing an error signal indicative of the difference, second means for comparing the torques of the two engines for producing a torque unbalance signal indicative of the difference in torques produced by said engines, first and second summer means each cooperative with each of said engines responding to said error signal to adjust the speed of either of said engines to minimize said error, and means for selectively coupling said torque unbalance signal with either of said first or second summer means for further adjusting said engine to minimize said torque error signal.

7. A power management control as claimed in claim 6 including integrating circuitry to produce the integrals of said speed error signal and said torque unbalance signal.